United States Patent
Liu

(10) Patent No.: US 9,464,623 B2
(45) Date of Patent: Oct. 11, 2016

(54) METHOD AND DEVICE FOR POWER GENERATION

(71) Applicant: Western Michigan University Research Foundation, Kalamazoo, MI (US)

(72) Inventor: Tianshu Liu, Portage, MI (US)

(73) Assignee: Western Michigan University Research Foundation, Kalamazoo, MI (US)

(*) Notice: Subject to any disclaimer, the term of this patent is extended or adjusted under 35 U.S.C. 154(b) by 774 days.

(21) Appl. No.: 13/681,000

(22) Filed: Nov. 19, 2012

(65) Prior Publication Data
US 2013/0076036 A1  Mar. 28, 2013

Related U.S. Application Data

(63) Continuation-in-part of application No. 12/882,253, filed on Sep. 15, 2010, now abandoned.

(60) Provisional application No. 61/276,871, filed on Sep. 17, 2009.

(51) Int. Cl.
*F03D 7/00* (2006.01)
*F03D 3/06* (2006.01)

(52) U.S. Cl.
CPC ............... *F03D 7/00* (2013.01); *F03D 3/068* (2013.01); *Y02E 10/74* (2013.01)

(58) Field of Classification Search
CPC .......... F03D 7/06; F03D 7/061; F03D 3/068; F03D 3/005
USPC ........................ 416/79; 415/4.1, 4.2, 4.3, 4.4
See application file for complete search history.

(56) References Cited

U.S. PATENT DOCUMENTS

| 4,115,027 A | 9/1978 | Thomas |
| 4,168,439 A * | 9/1979 | Palma ............................. 290/44 |
| 4,180,367 A * | 12/1979 | Drees ............................ 416/119 |
| 4,197,055 A | 4/1980 | Campbell |
| 4,299,198 A | 11/1981 | Woodhull |
| 4,470,770 A | 9/1984 | Grose |

(Continued)

OTHER PUBLICATIONS

Jones et al., Oscillating-Wing Power Generation, Proceedings of the 3rd ASME/JSME Joint Fluids Engineering Conference, Jul. 18-23, 1999, San Francisco, CA, pp. 1-6.

(Continued)

*Primary Examiner* — Craig Kim
*Assistant Examiner* — Maxime Adjagbe
(74) *Attorney, Agent, or Firm* — Price Heneveld LLP

(57) ABSTRACT

A fluid flow-powered generator and a method for using the same are described herein. The generator has a rotatable frame, with a first wing and a second wing. The first wing and second wing are pivotally mounted to the frame to allow the angle of attack to be adjusted. A controller is also provided to direct adjustment of the angle of attack of the first wing and the second wing in a coordinated manner while the fluid flow-powered generator is in use. In certain embodiments, the fluid flow-powered generator is operable as an oscillating generator and in other embodiments, the fluid flow-powered generator is operable as a rotating generator. The rotating generator can be arranged along a horizontal axis or a vertical axis. Additionally, certain horizontally oriented generators may be operated as either oscillating generators or rotating generators.

17 Claims, 11 Drawing Sheets

(56) References Cited

U.S. PATENT DOCUMENTS

| | | | |
|---|---|---|---|
| 4,525,122 A | 6/1985 | Krnac | |
| 4,595,336 A | 6/1986 | Grose | |
| 5,332,925 A | 7/1994 | Thomas | |
| 6,273,680 B1 | 8/2001 | Arnold | |
| 6,652,232 B2* | 11/2003 | Bolduc | 416/24 |
| 6,872,045 B1 | 3/2005 | Weaver et al. | |
| 7,258,527 B2* | 8/2007 | Shih | 416/17 |
| 7,905,705 B2 | 3/2011 | Kelley | |
| 8,038,384 B2 | 10/2011 | Brown | |

OTHER PUBLICATIONS

Isogai et al., Effects of Dynamic Stall on Propulsive Efficiency and Thrust of Flapping Airfoil, AIAA Journal, vol. 37, No. 10, Oct. 1999, pp. 1145-1151.

Fei et al., A Fluttering-to-Electrical Energy Transduction System for Consumer Electronics Applications, Proceedings of the 2009 IEEE International Conference on Robotics and Biomirnetics, Dec. 19-23, 2009, Guilin, China, pp. 580-585.

Matsumoto et al., Controlled Aerodynamic Instability Phenomena—An Alternative Approach for Wind Power Generation Systems, The Nineteenth KKCNN Symposium on Civil Engineering, Dec. 10-12, 2006, Kyoto, Japan, 4 pages.

Abiru et al., Study on a Flapping Wing Hydroelectric Power Generation System, Journal of Environment and Engineering, vol. 6, No. 1, 2011, pp. 178-186.

Shimizu, Multi-Objective Design Study of a Flapping Wing Generator, 24th International Congress of the Aeronautical Sciences, 2004, pp. 1-8.

Kinsey et al., Parametric Study of an Oscillating Airfoil in a Power-Extraction Regime, AIAA Journal, vol. 46, No. 6, Jun. 2008, pp. 1318-1330.

McKinney et al., The Wingmill: An Oscillating-Wing Windmill, J. Energy, vol. 5, No. 2, Mar.-Apr. 1981, pp. 109-115.

Shimizu et al., Multiobjective Design Study of a Flapping Wing Power Generator, Journal of Fluids Engineering, vol. 130, Feb. 2008, pp. 1-8.

Fei et al, A Wind-Flutter Energy Converter for Powering Wireless Sensors, Sensors and Actuators A, vol. 173, 2012, pp. 163-171.

Jones et al., An Investigation of the Fluid-Structure Interaction in an Oscillating-Wing Micro-Hydropower Generator, Transactions on the Built Environment, vol. 71, 2004, pp. 73-82.

Matsumoto et al., Flutter Instability and Recent Development in Stabilization of Structures, Journal of Wind Engineering and Industrial Aerodynamics, vol. 95, Mar. 2007, pp. 888-907.

Peng et al., Energy Harvesting Through Flow-Induced Oscillations of a Foil, Physics of Fluids, vol. 21, 123602, Dec. 2009, pp. 10.

Tang et al., Cantilevered Flexible Plates in Axial Flow: Energy Transfer and the Concept of Flutter-Mill, Journal of Sound and Vibration, Vcl. 326, Jun. 2009, pp. 263-276.

\* cited by examiner

METHOD AND DEVICE FOR POWER GENERATION

CROSS REFERENCE TO RELATED APPLICATIONS

This application claims priority under 35 U.S.C. §119(e) to U.S. patent application Ser. No. 12/882,253, filed on Sep. 15, 2010, entitled WIND OSCILLATOR FOR POWER GENERATION, which claims the benefit of U.S. Provisional Patent Application No. 61/276,871, filed on Sep. 17, 2009, entitled WIND OSCILLATOR FOR POWER GENERATION, the entire disclosures of which are incorporated herein by reference.

FIELD OF THE INVENTION

The invention is directed to a fluid flow-powered device and a method for generating electrical energy.

BACKGROUND OF THE INVENTION

Wind energy, as a major sustainable clean energy source, has recently attracted an intense amount of attention. Government and industry have aggressively pushed the development of wind turbine technology, particularly devoted to the development of a wide range of reliable wind turbines.

In the long history of the use of wind kinetic energy, horizontal-axis wind turbines (HAWT) and vertical-axis wind turbines (VAWT) have been adopted as the main designs for extracting wind energy. In particular, HAWT is predominantly used for commercial power generation. The efficiency of turbine blades has improved considerably over the years by the advent of advanced aerodynamic designs. However, the basic law that aerodynamic force is proportional to the wing area of a blade remains unchanged. Thus, it is difficult to maximize the effective aerodynamic surface of rotating blades, while maintaining the structural integrity thereof, as the size of a wind turbine increases.

For medium and large size wind turbines, to reduce the centrifugal force in rotational motion, blades are usually long and slender particularly near the tips even though they are made of light composite materials. Thus, the effective aerodynamic area is very limited near the tip of a blade where a considerable amount of aerodynamic torque is generated. In addition, to further improve the aerodynamic efficiency, a mechanical-electrical device for active pitching can be installed inside of a slender blade. This arrangement not only adds a weight penalty on a slender blade, but also increases the structural complexity and weakens the structural integrity of the blade.

Furthermore, the installation and maintenance of long slender blades in large-size HAWT and VAWT is particularly difficult, and requires special equipment that may not be easily operated in certain terrain. For example, contamination of dead bugs and birds near the leading edges of blades could reduce the aerodynamic efficiency by 50%. Cleaning the contamination on blades of a large-size HAWT is not an easy task. These problems become bottlenecks in the development and cost-efficient use of medium and large size wind turbines. Improvements in existing water-powered generators are also desirable.

SUMMARY OF THE INVENTION

One embodiment of the present invention includes a fluid flow-powered generator with a rotatable frame, a first wing and a second wing, with each wing having a leading edge, a trailing edge, a first end and a second end. The angle of attack of each wing is defined by the orientation of a chord line extending through the leading and trailing edges of the wing. The first and second wings are pivotally mounted to the frame to allow the angle of attack to be adjusted. The generator also includes a controller to direct the adjustment of the angle of attack of the first wing and the second wing in a coordinated manner, while the fluid flow-powered generator is in use.

The fluid flow-powered generator can be an oscillating fluid flow-powered generator or a rotary fluid flow-powered generator. In an oscillating fluid flow-powered generator, the rotational motion of the frame is constrained, and the angle of attack of the first and second wings are adjusted to allow the frame to "flap" back and forth with alternating clockwise and counterclockwise rotations. In a rotary fluid flow-powered generator, the rotational motion of the frame is not constrained, and the angle of attack of the first and second wings is adjusted to allow the frame to spin through the full rotation.

Another embodiment of the invention includes a rotary fluid flow-powered generator, including a rotatable frame, a first wing and a second wing, each wing having a leading edge, a trailing edge, a first end and a second end. Each wing has an adjustable angle of attack. A controller is also provided to direct the adjustment of the angle of attack of the first wing and the second wing in a coordinated manner while the fluid flow-powered generator is in use.

Another embodiment of the invention includes a method of generating electricity, including the steps of providing a fluid flow-powered generator having a rotatable frame with a central axis member, a first wing and a second wing attached to the frame, and a controller, wherein the first wing and second wing each have an adjustable angle of attack. The angle of attack of the first wing and the angle of attack of the second wing are actively adjusted in a coordinated manner. The motion of the central axis is translated into electrical energy. It would be understood to persons having skill in the art that fluid flow-powered generators can be used with various fluids, including without limitation, water and air.

DETAILED DESCRIPTION OF THE INVENTION

Figure 1:
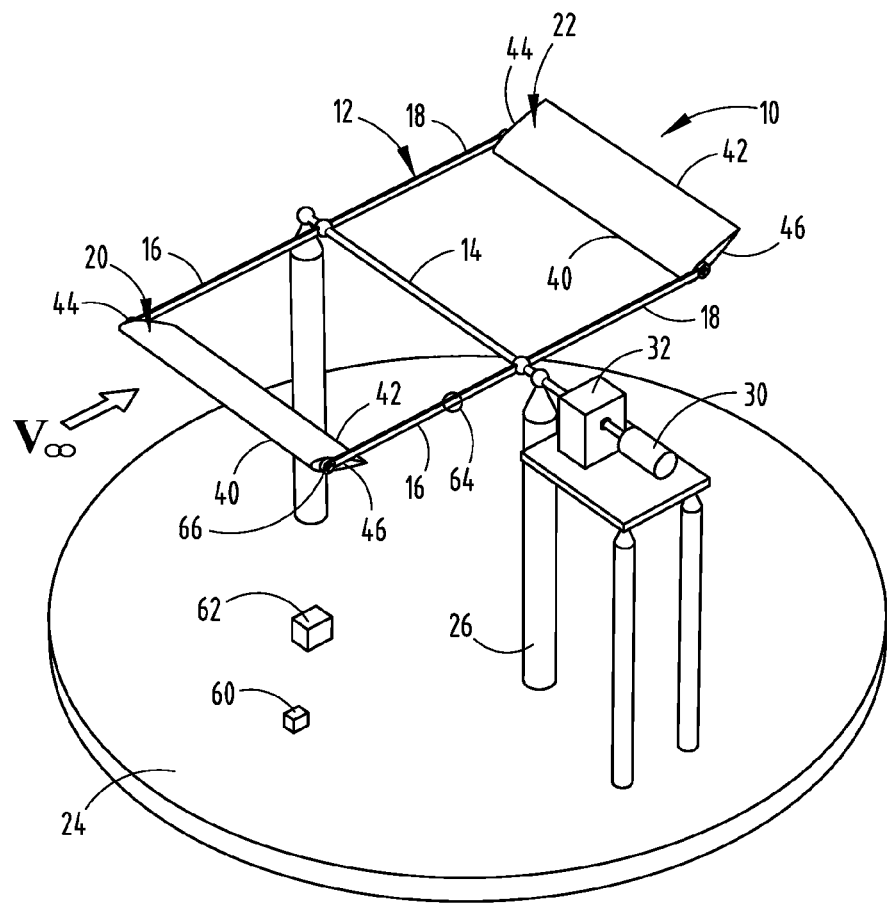
FIG. 1 is a perspective view of a fluid flow-powered generator.

Certain terminology will be used in the following description for convenience in reference only, and will not be limiting. For example, the words "upwardly", "downwardly", "rightwardly" and "leftwardly" will refer to the directions shown in the drawings to which reference is made. The words "forward" or "forwardly" will be used in relationship to the upwind wing that is oriented toward the direction of a wind, and the words "rearward" or "rearwardly" will refer to the direction of the leeward wing spaced downwind from the forward wing. The words "inwardly" and "outwardly" will refer to directions toward and away from, respectively, the center of the frame or the central axis member. Said terminology will include the words specifically mentioned, derivatives thereof, and words of similar import.

A wind-powered generator 10, is described herein having a rotatable frame 12, with a first wing 20 and a second wing 22. Although the invention may be described herein with regard to wind power, those skilled in the art will recognize that the invention can be powered using any type of fluid flow such as wind, water, particulate matter or the like. Each wing 20, 22 has a leading edge 40, a trailing edge 42, a first end 44 and a second end 46. Each wing 20, 22 also has an angle of attack ("AoA") which is defined by the orientation of a chord line extending through the leading and trailing edges 40, 42 thereof. The first wing 20 and second wing 22 are pivotally mounted to the frame 12 to allow the AoA ($\alpha_1$) to be adjusted. A controller 62 is also provided to direct adjustment of the AoA of the first wing 20 and the second wing 22 in a coordinated manner while the wind-powered generator 10 is in use.

Figure 4:
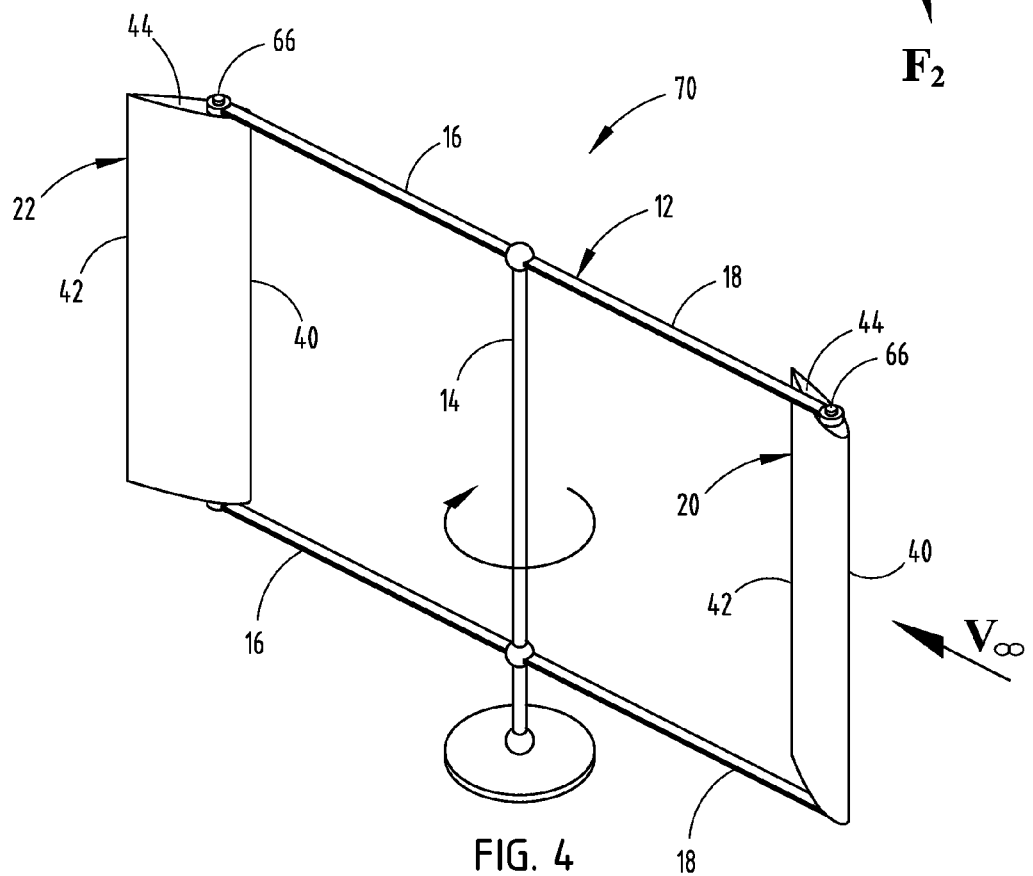
FIG. 4 is a perspective view of a vertical axis rotor.

In certain embodiments, the wind-powered generator 10 is operable as an oscillating wind-powered generator (FIG. 1) and in other embodiments, the wind-powered generator 10, 70 is operable as a rotating wind-powered generator (FIG. 1, FIG. 4). The rotating wind-powered generator 10, 70 can be arranged along a horizontal axis 10 or a vertical axis 70. Additionally, certain horizontally oriented wind-powered generators 10 may be operated as either oscillating wind-powered generators or rotating wind-powered generators.

One embodiment includes a rotary wind-powered generator 10 including a rotatable frame 12, a first wing 20 and a second wing 22. Each wing 20, 22 has a leading edge 40, a trailing edge 42, a first end 44 and a second end 46. Each wing 20, 22 also has an adjustable AoA and a controller 62 to direct adjustment of the AoA of the first wing 20 and the second wing 22 while the wind-powered generator 10 is in use.

Another embodiment of the invention includes a method of generating electricity, including providing a wind-powered generator 10, 70 with a rotatable frame 12 with a central axis member 14, first and second wings 20, 22 attached to the frame 12, and a controller 62, wherein the first and second wings 20, 22 each have an adjustable AoA. The AoA of the first wing 20 and the second wing 22 are actively adjusted in a coordinated manner, and the motion of the central axis member 14 is translated into electrical energy.

FIG. 1 shows an embodiment of a horizontal axis wind-powered generator 10, having a rotatable frame 12 with a central axis member 14, a first pair of transverse arms 16 and a second pair of transverse arms 18. The wind-powered generator 10 further includes a first wing 20, and a second wing 22. The rotatable frame 12 is elevated above a rotating table 24 with supports 26. The wind-powered generator 10 can be operated in an oscillating or rotary motion through active control of the AoAs of the wings 20, 22, as further described below. An electrical generation device 30 is operably attached to the central axis member 14 of the frame 12. In the oscillating mode, mechanical mechanisms (not shown) are used to convert the oscillating rotational motion of the central axis member 14 to a linear reciprocating motion, and then to a circular motion to drive the generator 30. In the rotor mode, rotational motion of the central axis member 14 directly drives the generator 30, optionally through a gearbox 32.

The first and second pairs of transverse arms 16, 18 extend generally perpendicularly away from the central axis member 14 in the same plane. In the embodiment shown in FIG. 1, the central axis member 14 extends the full length of the frame 12, between the transverse arms 16, 18, however, the central axis member 14 is not required to be continuous between the transverse arms 16, 18. The first wing 20 and the second wing 22 each have a generally rectangular shape with a leading edge 40, a trailing edge 42, a first end 44 and a second end 46. The first wing 20 is pivotally mounted between the first pair of transverse arms 16, with pivotal mountings 50 at the first end 44 and the second end 46 of the first wing 20. The second wing 22 is pivotally mounted between the second pair of transverse arms 18, with the pivotal mountings 50 at the first end 44 and the second end 46 of the second wing 22. In the embodiment shown in FIG. 1, the pivotal mountings 50 of the first wing 20 and the second wing 22 are located about one quarter of the distance from the leading edge 40 to the trailing edge 42 of the wing 20, 22.

The first wing 20 and second wing 22 have balanced weights, and the first and second sets of transverse arms 16, 18 have the same length. Additionally, the weight of the first wing 20 and the weight of the second wing 22 are each balanced around the pivotal mounting points 50 of the first wing 20 and the second wing 22, such that weight is not a significant factor in the design, allowing effective wing areas to be large. The wing weight is not a significant factor in the design, and wing loading is typically low. Therefore wings 20, 22 can be made from light composite materials to reduce the power and energy required to adjust the wings 20, 22 and their size is less limited by the structural requirements of frame 12 to support them.

The wings 20, 22 shown in FIG. 1 have a symmetrical airfoil, though other shapes, such as cambered airfoil sections, could also be used. Preferred wing dimensions include wings having a span of about 10 to about 30 meters and a chord length of about 1 to about 3 meters. Multiple wings may be combined to achieve the total wing length described herein. The total length of each transverse arm is preferably between about 10 meters and about 50 meters. The selection of the wing size and arm length depends upon the desired output power.

In the embodiment shown in FIG. 1, the rotating frame 12 with mounted first and second wings 20, 22 is elevated on supports 26 to allow rotation of the frame 12 about the central axis member 14. The supports 26 and frame 12 are mounted on a rotating table 24. The rotating table 24 rotates so that the leading edges 40 of the first wing 20 and second wing 22 face the incoming wind. One or more wind sensors 60 are used to detect the direction and speed of the incoming wind, and then the rotating table 24 is rotated accordingly to put the rotating frame 12 and the wings 20, 22 in the desired orientation with respect to the incoming wind. One non-limiting example of wind sensors is a Pitot tube and a wind vane, to measure wind speed and wind direction, respectively. Other known of methods for measuring wind speed and direction can also be used.

A controller 62 calculates the desired effective AoA ($\alpha_1$) of the first wing 20 and the second wing 22 to maintain the maximum effective AoA before stall, and therefore to achieve the largest lift magnitude in all phases of operation of the wind-powered generator 10. Feedback closed-loop control is used by the controller 62 to direct adjustment of the first wing 20 and adjustment of the second wing 22 to maintain the desired effective AoA.

Figure 2:
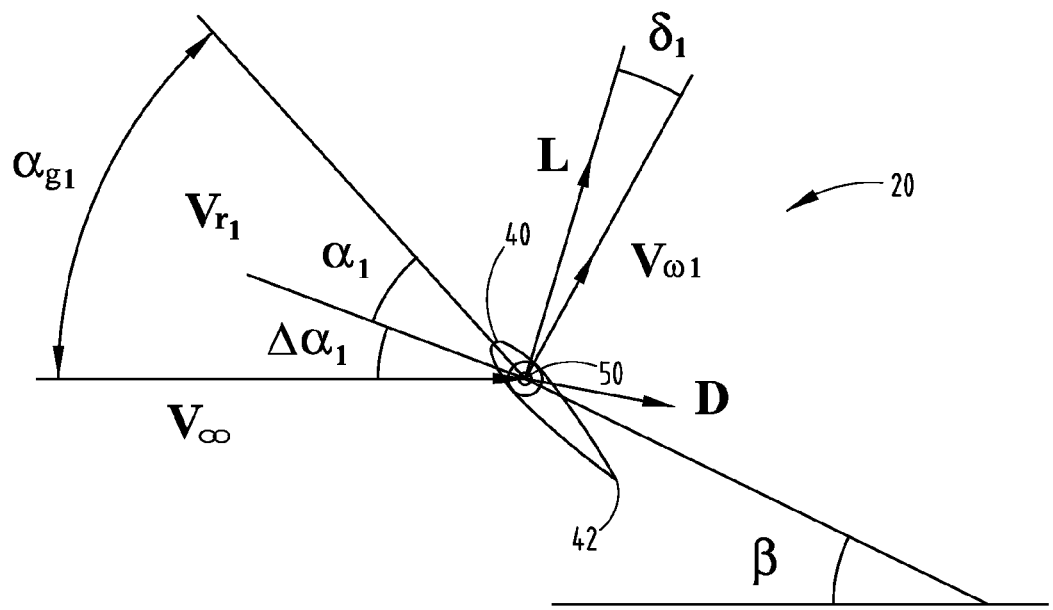
FIG. 2 is a simplified mechanical model showing velocity and force vectors for a wing.

FIG. 2 depicts velocity and force vectors acting on a wing 20, 22 as described herein. The effective AoA ($\alpha_1$) is dependent upon the linear velocity of the wing in the rotational motion ($V_{\omega 1}$) and the incoming wind speed ($V_\infty$). The effective AoA ($\alpha_1$) is estimated by the controller 62 based in part on the rotational rate and angular position of the frame 12, which are measured by a sensor 64. Such a sensor 64 may be an accelerometer located on a transverse arm 16, 18 of the frame 12, an optical sensor, or any other sensor capable of measuring the rotational rate and angular position of the frame 12. Determination of the effective AoA ($\alpha_1$) also involves input to the controller 62 of the incoming wind speed measured by the wind sensor 60.

The controller 62 directs the adjustment of the geometric AoA ($\alpha_{g1}$) to maintain the desired effective AoA ($\alpha_1$) of the wing 20, 22 during operation of the wind-powered generator 10. The actual pivoting of the wing 20, 22 to achieve the desired effective AoA is carried out by a motor 66 controlled by the controller 62. One type of motor 66 that can be used to pivot the wings 20, 22 is a servo motor operably attached to the wings 20, 22 to adjust the AoA. Such a servo motor 66 can be mounted at or near the pivot point of the wing 20, 22 to effect the change of the AoA. This motor mounting point would be at the one quarter chord length point in the embodiment shown in FIG. 1, where the concentration of the weight of the wing 20, 22 is and where the wing 20, 22 is pivotally mounted to the transverse arm 16, 18.

Figure 3:
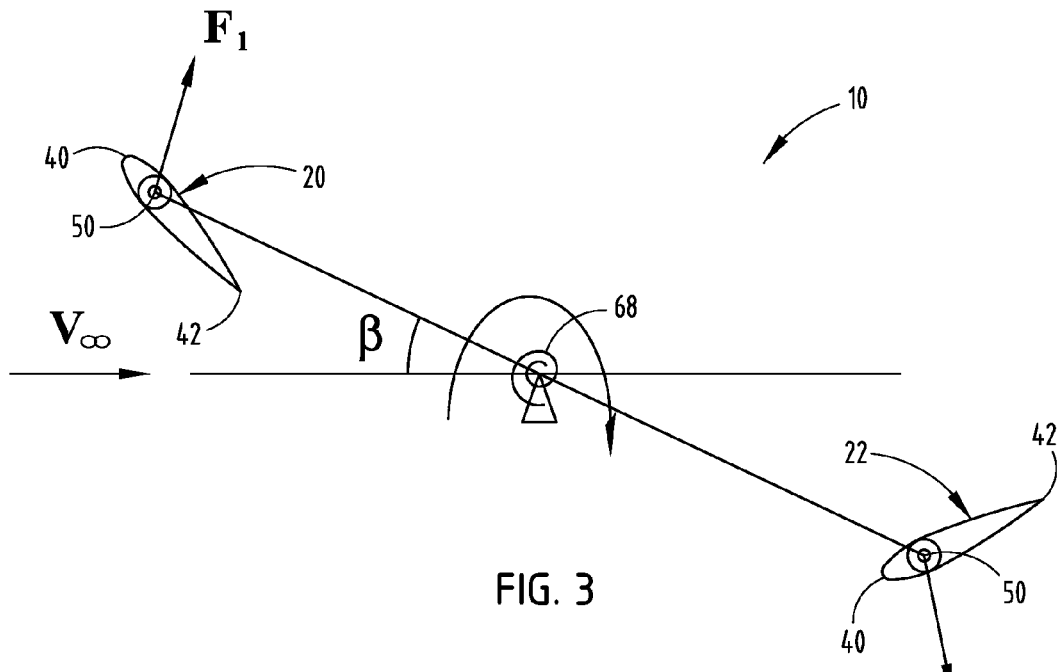
FIG. 3 is a simplified mechanical model of an oscillator.

In operation as an oscillator 10, as shown in FIGS. 1 and 3, the first wing 20 and second wing 22 are positioned with the leading edges 40 toward the incoming wind $V_\infty$, and the first wing 20 located upwind of the second wing 22. In the first half of an oscillating cycle, the effective AoA ($\alpha_1$) of the first wing 20 is set to be positive and the effective AoA ($\alpha_1$) of the second wing 22 is set to be negative, such that the aerodynamic lift generates a clockwise torque and motion, with rotation around the central axis member 14. In the second half of an oscillating cycle, the effective AoAs $\alpha_1$ of the first and second wings 20, 22 are reversed to the opposite signs, such that a counterclockwise torque and motion are generated about the central axis member 14. These effective AoAs $\alpha_1$ are controlled by the controller 62, and affected by motors 66 to actively adjust the AoA of the wings 20, 22. The oscillation of the first and second wings 20, 22 is sustained in a controllable way by extracting the wind energy for the generation of power.

In the oscillating mode, a spring 68 further restrains the rotational motion of the frame. The spring coefficient can be adjusted through trial to optimize the performance of the oscillating wind-powered generator 10. The oscillation is preferably maintained such that the angular position ($\beta$) of the frame 12 is limited to between about $-\pi/2$ to about $\pi/2$ by the active control of the AoA of the wings 20, 22 and the spring 68.

In one embodiment of the oscillating wind-powered generator 10, a linear gear is used to transform the oscillating angular motion of the central axis member 14 to a linear reciprocating motion of a rod. The reciprocating force transmitted by the rod drives a crank mechanism to generate a circular motion to the angular rate of the oscillation. Then, the rotational frequency is increased to a required one for the generator 30 through a gear box 32.

In use, the oscillating wind-powered generator as illustrated in FIGS. 1 and 3 is aligned with the central axis member 14 perpendicular to the incoming wind direction ($V_\infty$) via the rotating table 24, with the leading edge 40 of each wing 20, 22 facing the incoming wind direction ($V_\infty$). The AoA $\alpha_1$ of the wings 20, 22 is actively adjusted to generate rotational motion of the frame 12, including the central axis member 14. A sensor 64 measures the rotational rate and angular position of the frame 12, and this information, along with wind speed ($V_\infty$) determined by the wind sensor 60, is used by a controller 62 to actively adjust the AoA ($\alpha_1$) of the wings 20, 22 when the frame 12 reaches a pre-determined orientation. The controller 62 uses a feedback control loop to continue alternating the orientation of the first wing 20 and the second wing 22, generating an oscillating motion. The alternating rotational movement of the central axis member 14 is translated to linear reciprocating motion, which is then converted to rotational motion for the generation of electricity.

In functioning as a horizontal-axis rotor 10, as shown in FIGS. 1-3, the first wing 20 and second wing 22 are positioned with the leading edges 40 toward the incoming wind. Unlike an oscillating operation, however, the frame 12 is not mechanically constrained and is permitted to undergo full rotation about the central axis member 14, with the angular position ($\beta$) of the frame 12 extending from 0 through $2\pi$.

Figure 5:
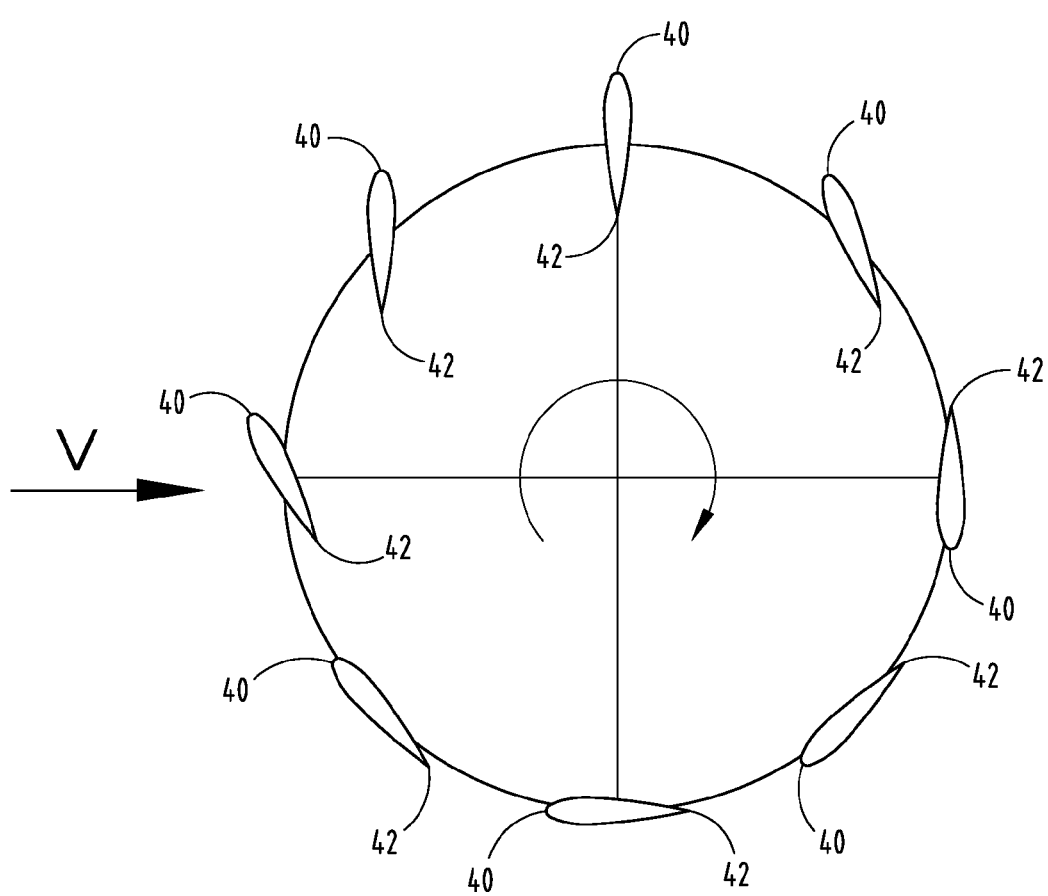
FIG. 5 is a simplified model showing the geometric angle of attack at the corresponding angular position of a wing in a rotational cycle of a rotor.

During operation as a rotor 10, in the first and fourth quarters of a rotational cycle (when $\beta$ is between about 0 and about $\pi/2$ and between about $3\pi/2$ and about $2\pi$), the effective AoA of the first wing 20 and the effective AoA of the second wing 22 are set to be positive, such that the aerodynamic lift creates a clockwise torque and rotational motion. In the second and third quarters of a rotational cycle (when $\beta$ is between about $\pi/2$ and about $3\pi/2$), the effective AoA of the first wing 20 and the effective AoA of the second wing 22 are reversed to be negative, to sustain the clockwise torque and motion. FIG. 5 includes a simplified mechanical model showing the geometric AoA at the corresponding angular position (β) of a wing in a rotational cycle of a wind rotor 10. Alternatively, the effective AoA of the first wing 20 and second wing 22 can be set negatively during the first and fourth quarters of the rotary cycle to generate a counter-clockwise torque and motion, and positively during the second and third quarters of the rotary cycle to sustain the counterclockwise torque and motion.

When in operation as a rotor 10, rotational motion of the central axis member 14 is directly generated. The rotational frequency of the central axis member 14 is optionally converted to that required for generation of electricity through a gear box 32.

In addition to the horizontal axis rotor 10, as shown in FIG. 1, when used in the rotary mode, the central axis member 14 and wings 20, 22 can also be arranged along a vertical axis to form a vertical-axis wind rotor 70, as shown in FIG. 4. In this configuration, the central axis member 14 is oriented in a generally vertical direction, with the first pair of transverse arms 16 and the second pair of transverse arms 18 extending generally perpendicularly therefrom in generally the same plane. The first wing 20 is mounted between the first pair of transverse arms 16 and the second wing 22 is mounted between the second pair of transverse arms 18, with the first and second wings 20, 22 in a generally vertical orientation. In the vertical axis mode, the operation of the rotor 70 is generally the same as in the horizontal axis rotor 10, though a rotary table 24 is not required to align the rotor 70 with the wind direction $V_\infty$ to achieve maximum efficiency.

In use, the horizontal axis rotary wind-powered generator 10 as illustrated in FIG. 1 is aligned with the central axis member 14 perpendicular to the incoming wind direction $V_\infty$ via the rotating table 24, with the leading edge 40 of each wing 20, 22 facing the incoming wind direction $V_\infty$. In a vertical axis rotary wind-powered generator 70 as illustrated in FIG. 4, alignment with the wind direction $V_\infty$ is not required. In both the horizontal and vertical axis embodiments 10, 70, the AoA of the wings 20, 22 is actively adjusted to generate rotational motion of the frame 12, including the central axis member 14. A sensor 64 measures the rotational rate and angular position of the frame 12, and this information, along with the wind speed determined by the wind sensor 60, is used by a controller 62 to actively adjust the AoA of the wings 20, 22 when the frame 12 reaches a pre-determined orientation. The controller 62 uses a feedback control loop to continue adjusting the orientation of the first wing 20 and the second wing 22, generating a rotary motion. The rotational movement of the central axis member 14 is used to drive the generation of electricity.

Compared to the aerodynamics of traditional horizontal axis wind turbines and vertical axis wind turbines, a quasi-steady aerodynamic analysis of a wind oscillator 10 based on the lifting-line model for rectangular wings is more straightforward when the complicated wake interference of the first wing 20 to the second wing 22 at a crossing-over moment is not considered in a first order analysis. FIG. 3 shows a simplified mechanical model for a wind oscillator 10 driven by the aerodynamic forces on the first and second wings 20, 22. The gravitational forces on the first and second wing are not shown, as they do not play a significant dynamical role when the weights of the wings 20, 22 and the lengths of the transverse arms 16, 18 are balanced. For purposes of completing the calculations shown below and computing forces, it is assumed that the masses of the wings 20, 22 are concentrated at the one quarter chord line of the wings 20, 22, and that the masses of the wings 20, 22 are the same. It is also assumed that the lengths of the transverse arms 16, 18 from the central axis member 14 to the wing mounting points 50 are the same for the first wing 20 and the second wing 22. Also as shown in FIG. 3, the motion of the wind oscillator 10 is described by the angular position β(t) that is positive when it is in the upper half of the plane. The moment or torque around the pivot is positive when it moves clockwise.

FIG. 2 shows the relevant velocity and force vectors on the first wing 20. The geometric AoA ($\alpha_{g1}$) is the pitching angle of the wing's 20 chord line relative to the incoming wind velocity ($V_\infty$). Since the wing moves along a circular arc around the pivot at a linear tangential velocity ($V_{\omega 1}$), the effective AoA ($\alpha_1$) of the wing is the angle between the chord line and the relative velocity ($V_{r1}=V_\infty-V_{\omega 1}$). The change of AoA ($\Delta\alpha_1$) induced by the rotational movement of the first wing 20 is given by the equation:

$$\Delta\alpha_1 = \tan^{-1}\left[\frac{(l/V_\infty)d\beta/dt\cos\beta}{1-(l/V_\infty)d\beta/dt\sin\beta}\right] \quad (1)$$

where l is the length of the transverse arm 16, 18, between the central axis member 14 around which the transverse arm 16, 18 pivots and the mounting point 50 of the wing 20, 22. Therefore, the effective AoA is $\alpha_1=\alpha_{g1}-\Delta\alpha_1$. The angle between the lift and $V_{\omega 1}$ is $\delta_1=\beta-\Delta\alpha_1$.

Similarly, for the second wing 22, the induced change in the AoA is:

$$\Delta\alpha_2 = \tan^{-1}\left[\frac{-(l/V_\infty)d\beta/dt\cos\beta}{1+(l/V_\infty)d\beta/dt\sin\beta}\right] \quad (2)$$

where $\alpha_2=\alpha_{g2}-\alpha\Delta_2$, and $\delta_2=\beta+\Delta\alpha_2$.

The equation of motion for a wing oscillator 10 is:

$$2l^2m\frac{d^2\beta}{dt^2} = l(L_1\cos\delta_1 - L_2\cos\delta_2) + l(D_1\sin\delta_1 - D_2\sin\delta_2) - k_sl_s\beta \quad (3)$$

Where m is the mass of the wing, ks is the spring coefficient, and is the radial distance from the spring 68 to the central axis member or pivot point.

The lift of the first wing and second wing are calculated as:

$$L_1=C_{L1}q_{r1}S_w \quad (4)$$

and $$L2=C_{L2}q_{r2}S_w \quad (5)$$

where $S_w$ is the wing planform area, $q_{r1}=0.5\rho|V_{r1}|^2$ and $q_{r2}=0.5\rho|V_{r2}|^2$. The quasi-steady aerodynamics are considered when the reduced frequency is sufficiently low. Typically, the reduced frequency based on the frequency of changing the AoA, wind speed and the wing chord is less than 0.2, and therefore the quasi-steady assumption is a reasonable first-order approximation.

Before stall, the lift coefficients for the first wing 20 and the second wing 22 are given by $C_L+a[\alpha(t)-\alpha_{L-0}]$ for $\alpha<\alpha_s$, where $\alpha_s$ is the stall AoA. According to the lifting-line model, the lift slope is:

$$a = \frac{a_0}{1 + (a_0/\pi AR)(1 + \tau)} \quad (6)$$

where $\alpha_\rho = 2\pi$, AR is the wing aspect ratio and $\tau$ is a parameter related to the wing platform. After stall ($\alpha > \alpha_s$), an empirical model for $C_L$ is:

$$C_L = \frac{C_{D,max}}{2}\sin(2\alpha) + K_L\frac{\cos^2\alpha}{\sin\alpha} \quad (7)$$

where $K_L = (C_{Ls} - C_{Dmax}\sin\alpha_s\cos\alpha_s)\sin\alpha_s/\cos^2\alpha_s$. The relative dynamical pressures for the first and second wings 20, 22 are:

$$q_{r1} = \tfrac{1}{2}\rho V_{r1}^2 = \tfrac{1}{2}\rho[(V_{\omega 1}\cos\beta)^2 + (V_\infty - V_{\omega 1}\sin\beta)^2] \quad (8)$$

and $$q_{r2} = \tfrac{1}{2}\rho V_{r2}^2 = \tfrac{1}{2}\rho[(V_{\omega 2}\cos\beta)^2 + (V_\infty - V_{\omega 2}\sin\beta)^2] \quad (9)$$

where $V_{\omega 1} = V_{\omega 2} = 1\, d\beta/dt$.

The drags of the first wing 20 and second wing 22 are:

$$D_1 = C_{D1}q_{r1}S_w \quad (10)$$

and $$D_2 = C_{D1}q_{r1}S_w \quad (11)$$

For $\alpha < \alpha_s$, $C_D = C_{D^-} + KC_L^2$, where $K = (\pi eAR)^{-1}$. For $\alpha > \alpha_s$, $C_D = C_{Dmax}\sin^2\alpha + K_D\cos\alpha$, where $K = (C_{Ds} - C_{Dmax}\sin^2\alpha_s)/\cos\alpha_s$ and $C_{Dmax} = 1.11\_0.018\,AR$ for $AR \leq 50$.

Furthermore, the equation of motion is written as:

$$\frac{d^2\beta}{dt^2} = \frac{1}{2\tau_1^2}(C_{L1}\gamma_1\cos\delta_1 - C_{L2}\gamma_2\cos\delta_2) + \frac{1}{2\tau_1^2}(C_{D1}\gamma_1\sin\delta_1 - C_{D2}\gamma_2\sin\delta_2) - \frac{1}{2\tau_2^2}\beta \quad (12)$$

where the timescales are $\tau_1 = \sqrt{lm/(S_w q_\infty)}$ and $\tau_2 = \sqrt{l^2 m/(k_s l_s)}$, $\gamma_1 = 1 + \lambda^2 - 2\lambda\sin\beta$ and $\gamma_2 = 1 + \lambda^2 + 2\lambda\sin\beta$, and $\lambda = (l/V_\infty)\,d\beta/dt$ is the tip speed ratio. Equation (12) is a non-linear ordinary differential equation. The first term in the right-hand side of Equation (12) is a driving term from the aerodynamic lift, in which $C_{L1}$ and $C_{L2}$ always have the opposite signs by actively controlling the AoA of the first wing 20 and the second wing 22. The second term is a term related to the drag of the wings, which is small since the effect of the drags from the first wing 20 and the second wing 22 tend to be approximately equal and opposite, such that they cancel each other out. The third term is a stiffness term associated with the spring 68. Equation (12) is solved numerically by using the four-order Runge-Kutta method with the initial conditions of $\beta = 0$ and $d\beta/dt = 0$ at $t=0$.

The instantaneous mechanical power transmitted to the shaft of a generator is $P(t) = 2\pi f T_y \eta_{trans}$ where $T_{y1} = 2l|L_1\cos\delta_1 + D_1\sin\delta_1|$ is the torque, f is the frequency of oscillation, and $\eta_{trans}$ is the efficiency of the mechanical system in power transfer. Further, the power is rewritten as:

$$P(t) = 4\pi f l q_\infty S_w \eta_{trans}\gamma_1|C_{L1}\cos\delta_1 + C_{D1}\sin\delta_1| \quad (13)$$

The mean power $\langle P \rangle$ is obtained by averaging Equation (13) over a time period. The efficiency of power generation is estimated, which is defined as $\eta = \langle P \rangle / P_{flow}$, where $P_{flow} = q_\infty V_\infty S_{actuator}$, where $S_{actuator}$ is the actuator area that should be suitably defined. Thus, the efficiency is:

$$\eta = 4\pi\left(\frac{fl}{V_\infty}\right)\left(\frac{S_w}{S_{actuator}}\right)\eta_{trans}\langle\gamma_1|C_{L1}\cos\delta_1 + C_{D1}\sin\delta_1|\rangle \quad (14)$$

Equation (14) indicates that the efficiency is proportional to the tip speed ratio $fl/V_\infty$ and the ratio between the wing area and the actuator area $S_w/S_{actuator}$. Here, for a wind oscillator 10, the actuator area $S_{actuator} = 2Lb + cb/2$ is the vertically-projected area, where L is the length of the transverse arm 16, 18, b is the wing span and c is the wing chord.

In order to clearly understand the physical meanings of the terms in Equation (12), a model equation in a limiting case is given through linearization of Equation (12) for $|\beta| \ll 1$, and $|d\beta/dt| \ll 1$, Equation (12) is simplified as:

$$\frac{d^2\beta}{dt^2} = \left(\frac{1}{2\tau_1^2} - \frac{Ka^2\alpha_{L=0}}{\tau_1^2}\beta\right)\left(\alpha_{g1} - \alpha_{g2} - 2\frac{l}{V_\infty}\frac{d\beta}{dt}\right) + \frac{Ka^2}{2\tau_1^2}\beta(\alpha_{g1}^2 - \alpha_{g2}^2) - \frac{1}{2\tau_2^2}\beta \quad (15)$$

Further, for $\alpha_{L-0} = 0$ and $\alpha_{g1} = \alpha_{g2}$, Equation (14) becomes a linear vibration equation:

$$\frac{d^2\beta}{dt^2} = \frac{1}{\tau_1^2}\left(\alpha_{g1} - \frac{l}{V_\infty}\frac{d\beta}{dt}\right) - \frac{1}{2\tau_2^2}\beta \quad (16)$$

The forcing term in Equation (16) is $\alpha_{g1}/\tau_1^2$. The damping term is directly proportional to the induced change in AoA $\Delta\alpha_1 \approx (l/V_\infty)\,d\beta/dt = \lambda$, and the damping coefficient is $\tau_3/\tau_1^2$, where $\tau_3 = l/V_\infty$ is another timescale. The natural circular frequency is $\omega_n = (\sqrt{2}\tau_2)^{-1}$. To achieve the maximum lift, the effective AoA ($\alpha_1 = \alpha_{g1} - \Delta\alpha_1$ or $\alpha_2 = \alpha_{g2} - \Delta\alpha_2$) should be maintained at the AoA at $\max(C_L)$ denoted by $\alpha_{max(L)}$ in all the phases. The simplest waveform for the effective AoA is a square waveform jumping between $-\alpha_{max(L)}$ and $\alpha_{max(L)}$. For example, $\alpha_1 = \pm\alpha_{max(L)}$ for the first wing 20, where the positive and negative signs are taken when the first wing 20 moves clockwise and counterclockwise, respectively. The geometric AoA of the first wing 20 should be adjusted in the feedback control based on $\alpha_{g1} = \pm\alpha_{max(L)}(l/V_\infty)\,d\beta/dt$ for the linearized case and $\alpha_{g1} = \pm\alpha_{max(L)} + \Delta\alpha_1$ for a general case. According to Equation (16), such a control strategy for compensating the induced change in AoA essentially eliminates the damping term in the vibration system.

The mathematical analysis of a wind rotor 10 or 70 is basically the same as that for a wind oscillator 10, except that friction loading rather than spring damping is included. The equation of motion for a wind rotor 10, 70 is:

$$\frac{d^2\beta}{dt^2} = \frac{1}{2\tau_1^2}(C_{L1}\gamma_1\cos\delta_1 - C_{L2}\gamma_2\cos\delta_2) + \frac{1}{2\tau_1^2}(C_{D1}\gamma_1\sin\delta_1 - C_{D2}\gamma_2\sin\delta_2) - \frac{1}{2\tau_f}\frac{d\beta}{dt} \quad (17)$$

where the timescales are $\tau_1 = \sqrt{lm/(S_w q_\infty)}$ and $\tau_f = l^2 m/k_f$, $k_f$ is a friction coefficient, m is the mass of the wing, $\gamma_1 = 1 + \lambda^2 - 2\lambda\sin\beta$, $\gamma_2 = 1 + \lambda^2 + 2\lambda\sin\beta$ and $\lambda = (l/V_\infty)\,d\beta/dt$ is the tip speed ratio.

Similar to a wind oscillator 10, the effective AoA ($\alpha_1 = \alpha_{g1} - \Delta\alpha_1$ or $\alpha_2 = \alpha_{g2} - \Delta\alpha_2$) should be maintained at $\alpha_{max(L)}$ in all the phases of rotation to obtain maximum lift. Those skilled in the art will further recognize that at high wind speed, maximum lift may not be used because of damage to the wind generator. For the first wing 20, $\alpha_1 = \alpha_{max(L)}$ when β is between about 0 and about π/2 and when β is between about 3π/2 and about 2π, and $\alpha_1 = -\alpha_{max(L)}$ when β is between about π/2 and about 3π/2. The designated function for the effective AoA is the same for the second wing 22. The geometric AoA of the first wing 20 is adjusted in a feedback control based on $\alpha_{g1} = \pm\alpha_{max(L)} + \Delta\alpha_1$. Equation (17) is solved numerically by using the four-order Runge-Kutta method with the initial conditions β=0 and dβ/dt=0 at t=0. The instantaneous and mean mechanical powers transmitted to the shaft of a generator 30 are calculated by using Equation (13) and the efficiency is calculated by using Equation (14). The rotational frequency f in a wind rotor 10, 70 is directly related to the wind speed $V_\infty$. Therefore, the rotational frequency f in a wind rotor is determined by the solution of Equation (17).

The following table provides design parameters for one particular embodiment of a wind oscillator 10:

TABLE 1

Design Parameters for a Medium-Size Wind Oscillator

| Components | Design Values |
|---|---|
| Single wing mass (kg) | 100 |
| Arm length (m) | 8 |
| Single wing area (m²) | 40 |
| τ | 0.2 |
| Oswald efficiency | 0.8 |
| Zero-lift AoA (degrees) | 0 |
| Stall AoA (degrees) | 12 |
| Zero-lift drag coefficient for the wing 30 | 0.05 |
| Zero-lift drag coefficient for the wing 40 | 0.05 |
| Air density (kg/m³) | 1.21 |
| Spring constant 1 (N-s) | 30000 |
| Spring constant 2 (N-s) | 200000 |
| $1_s$ (m) | 0.5 |
| CL at stall AoA | 1.5 |
| CD at stall AoA | 0.2 |
| Amplitude of AoA control (degrees) | 12 |
| $\eta_{trans}$ | 0.8 |

Several figures are provided herein which illustrate the operation and parameters of the embodiment of the wind oscillator 10, as further described below.

In this embodiment, it is assumed that the wing masses are concentrated at the one quarter chord line of the first and second wings 20, 22, and that the mass of the first wing 20 is the same as the mass of the second wing 22. The length of the transverse arm 16, 18 from the pivot point or central axis member 14 to the wing mounting 50 is also the same for the first pair of transverse arms 16 and the second pair of transverse arms 18. The wind speed $V_\infty$ and the frequency of changing the AoA are adjustable parameters.

The wing mass of each wing 20, 22 is 100 kg, which could be reduced by using lighter materials or differently sized wings 20, 22. The wing weight does not play a critical role in the dynamics of an oscillator 10 when the first wing 20 and the second wing 22 are in balance. However, due to the effect that the wing mass may have on the actuating power required for controlling the AoA of the wings 20, 22 and the structural requirements of frame 12, reduction of the wing mass may be desirable in certain applications.

The single wing area is 40 m². This wing area could also be achieved using a multiple wing configuration.

A double spring configuration is used, such that the spring coefficient is ks=30,000 N-s for |β|≤10° and ks=200,000 N-s for |β|>10°. Equation (12) with the initial conditions β=0 and dβ/dt=0 is solved numerically using the four order Runge-Kutta method.

Figure 6:
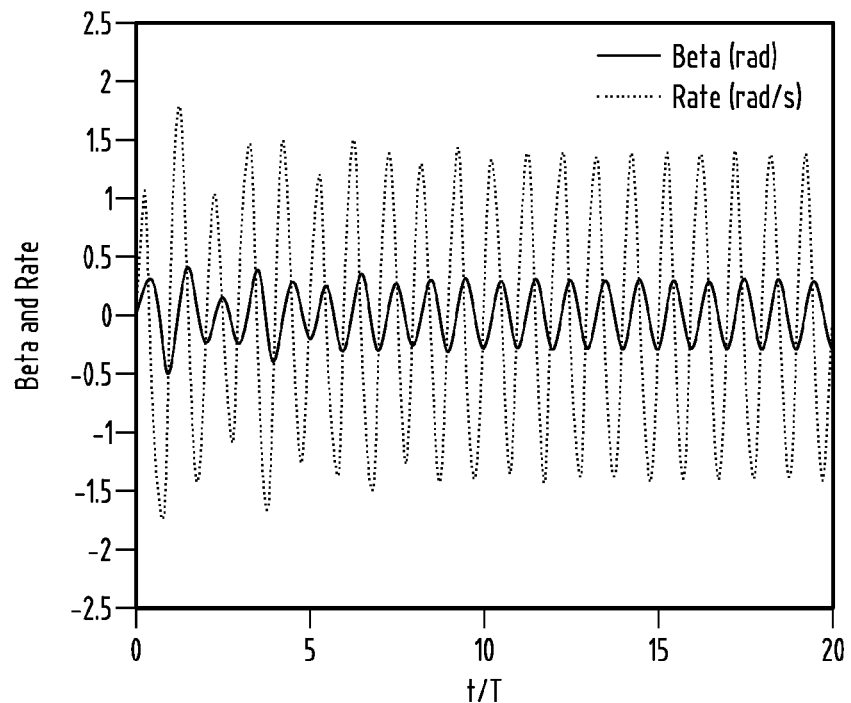
FIG. 6 is a graph of the angular position and rate versus time for a wind oscillator.
Figure 7:
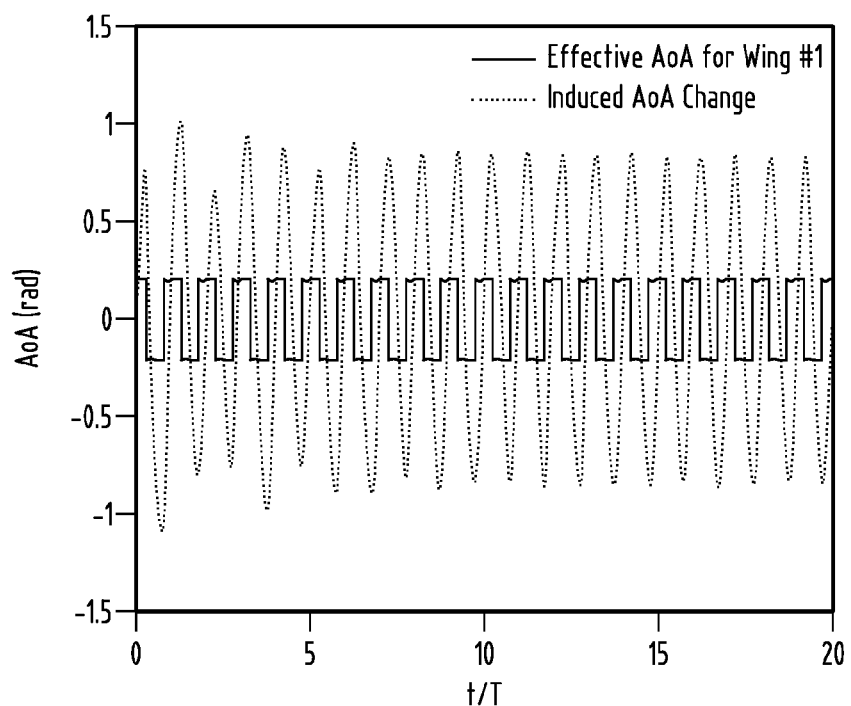
FIG. 7 is a graph of the induced change in the angle of attack and the effective angle of attack over time in a wind oscillator.

FIG. 6 demonstrates the angular position β(t) and dβ/dt for a wind speed of 10 m/s and f=0.7 Hz, as described in this first embodiment. In this case, the induced change in AoA is compensated through a feedback loop, such that the effective AoA has a square waveform varying between the positive and negative $\alpha_{max(L)}$ to achieve the maximum lift. FIG. 7 illustrates the induced change in the AoA and the effective AoA after compensating the induced AoA change for the first wing 20. The induced change in the AoA is large in this embodiment, and would alter a prescribed waveform of the geometric AoA if it was not compensated by feedback control.

Figure 8:
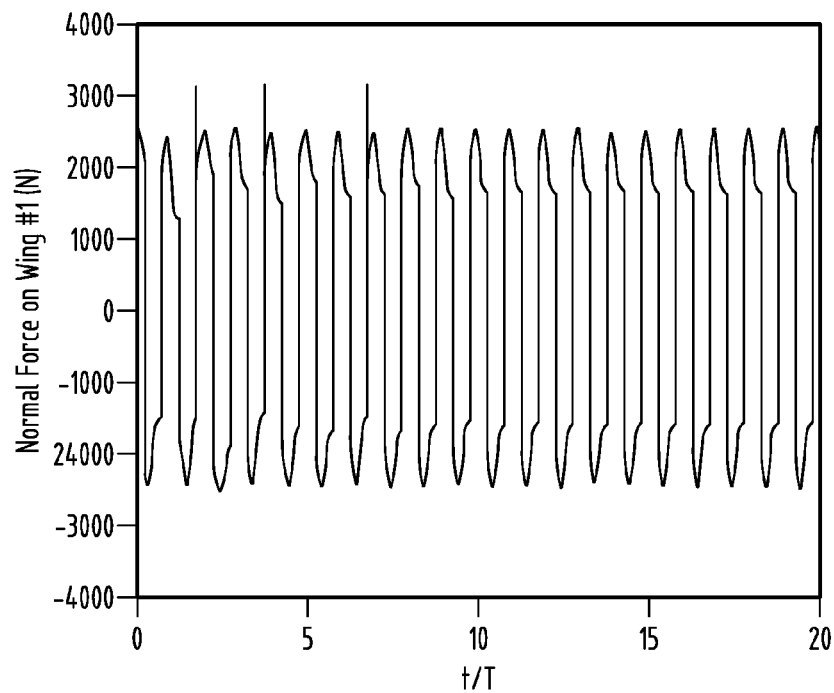
FIG. 8 is a graph of the aerodynamic force normal to the arm for the wing in an oscillator.
Figure 9:
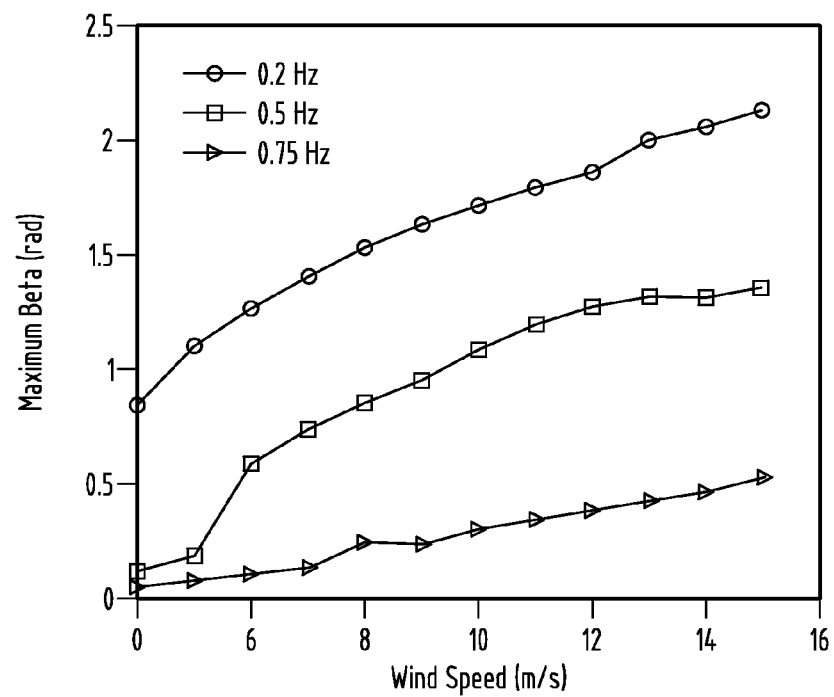
FIG. 9 is a graph of the angular position of a wing as a function of wind speed for different frequencies of changing the angle of attack in a wind oscillator.

FIG. 8 illustrates the aerodynamic force normal to the transverse arm 16 for the first wing 20 in the example oscillator 10 embodiment, with a wind speed of 10 m/s and f=0.7 Hz. FIG. 9 illustrates the angular position of a wing 20, 22 as a function of wind speed $V_\infty$ for different frequencies of changing the AoA in a wind oscillator 10, with the maximum angular position that gives the range of oscillation.

Figure 10:
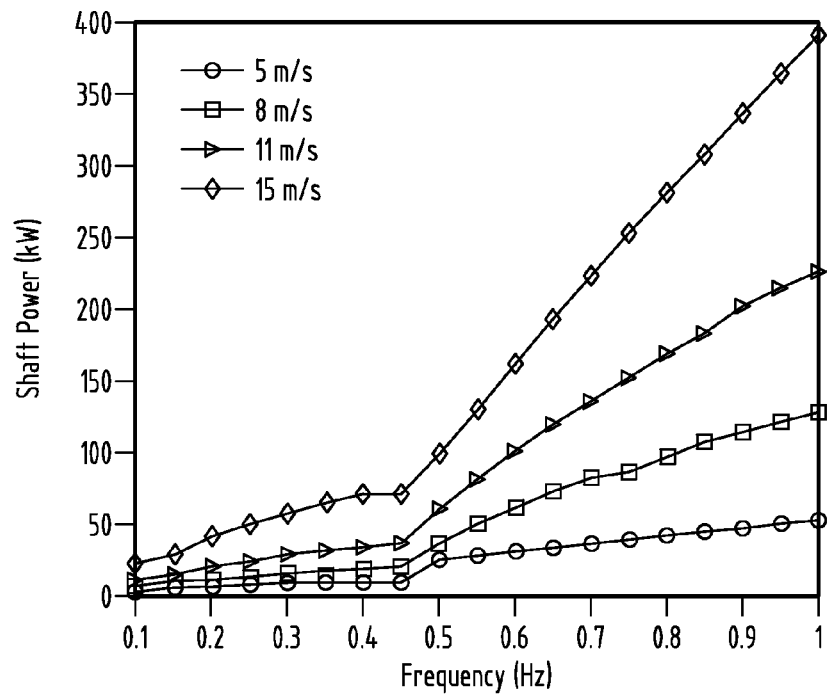
FIG. 10 is a graph of mean shaft power as a function of the frequency of changing angles of attack for different wind speeds in a wind oscillator.
Figure 11:
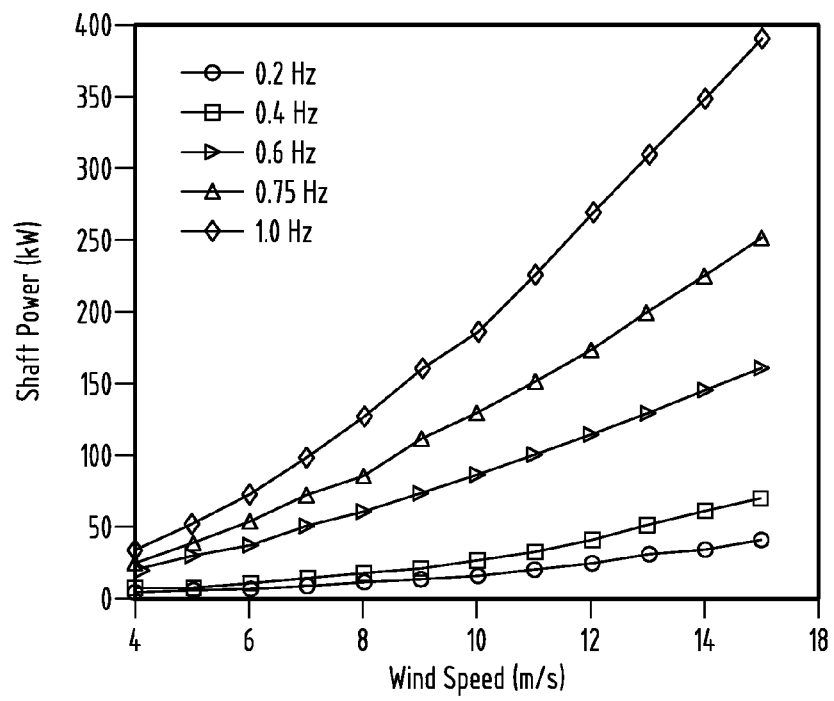
FIG. 11 is a graph of mean shaft power as a function of the wind speed for different frequencies of changing angle of attack in a wind oscillator.

FIG. 10 illustrates the mean shaft power as a function of the frequency of changing AoA for different wind speeds $V_\infty$. The mean power increases faster when the frequency is larger than 0.45 Hz. FIG. 11 illustrates the mean shaft power as a function of the wind speed $V_\infty$ for different frequencies of changing AoA in a wind oscillator 10. FIG. 11 demonstrates an increase of the mean shaft power with increasing wind speed $V_\infty$ for different frequencies of changing AoA, which is similar to a HAWT before stall. These results indicate that the output shaft power is 40-80 kW for the frequency of 0.75 Hz in a wind range of 4-8 m/s that covers the major portion of the distribution of wind speeds $V_\infty$. This wind oscillator 10 design is basically equivalent to a medium-scale wind turbine.

Figure 12:
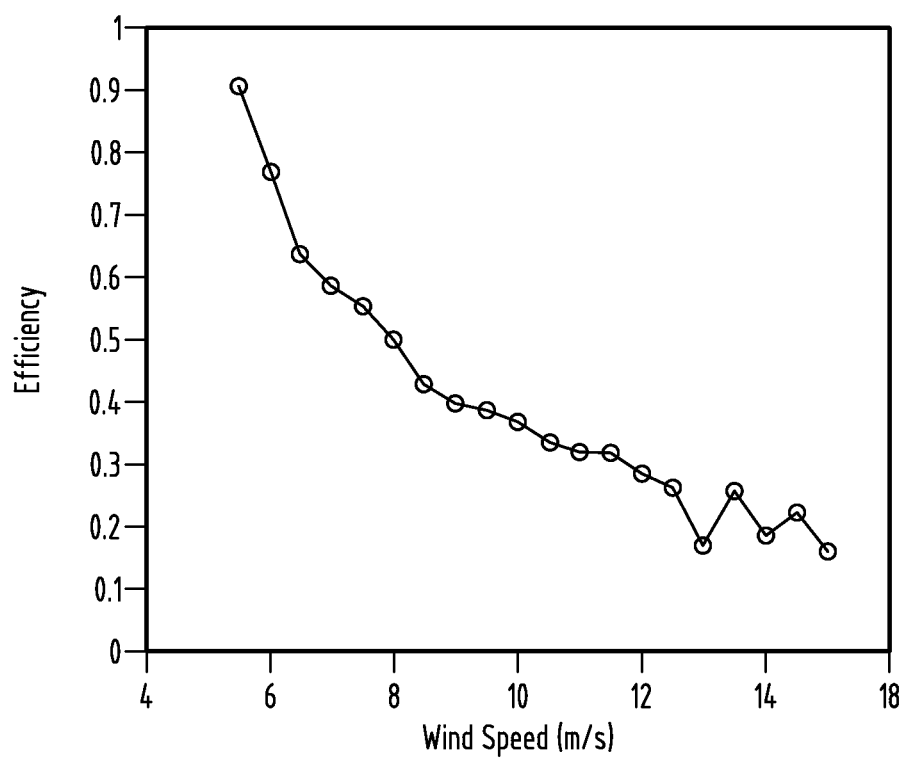
FIG. 12 is a graph of the efficiency of generation of power in a wind oscillator.

FIG. 12 shows the efficiency of generation of power in a wind oscillator for f=0.7 Hz. As indicated in FIG. 12, for a fixed oscillating frequency, the efficiency decreases as the wind speed $V_\infty$ increases. According to Equation (14), it is because the tip speed ratio (fl/$V_\infty$) is decreased. To maintain a constant efficiency, the frequency of oscillation can be proportionally increased with the wind speed.

The following table provides design parameters for one particular embodiment of a wind rotor:

TABLE 2

Design Parameters for a Wind Rotor

| Components | Design Values |
|---|---|
| Single wing mass (kg) | 100 |
| Arm length (m) | 6 |
| Single wing area (m²) | 20 |
| Wing aspect ratio | 12 |
| τ | 0.2 |
| Oswald efficiency | 0.8 |
| Zero-lift AoA (degrees) | 0 |
| Stall AoA (degrees) | 12 |
| Zero-lift drag coefficient for the wing #1 | 0.05 |
| Zero-lift drag coefficient for the wing #2 | 0.05 |
| Air density (kg/m³) | 1.21 |
| Friction constant (N-m-s) | 50 |
| CL at stall AoA | 1.5 |
| CD at stall AoA | 0.2 |
| $\eta_{trans}$ | 0.8 |

Several figures are provided herein which illustrate the operation and parameters of the embodiment of the wind rotor 10, as further described below. Equation (16), with the initial conditions of $\beta=0$ and $d\beta/dt=0$ is solved numerically using the four-order Runge-Kutta method.

Figure 13:
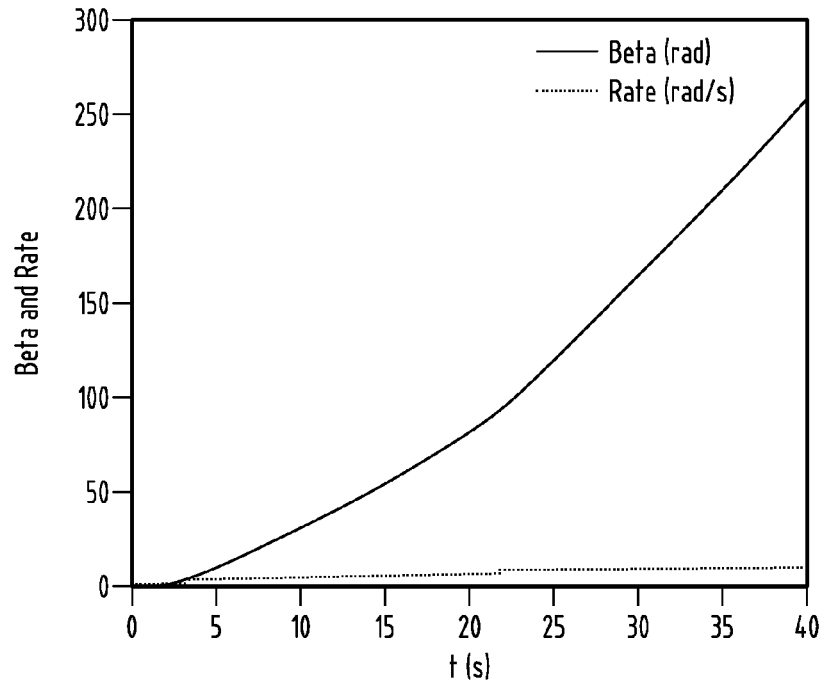
FIG. 13 is a graph of the rotational angle and rate as a function of time in a wind rotor.
Figure 14:
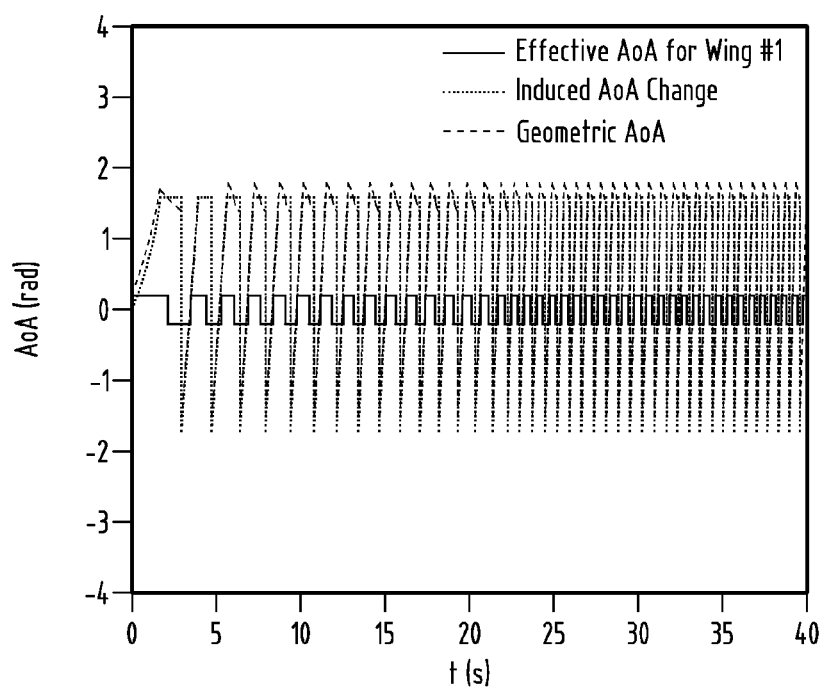
FIG. 14 is a graph of the effective angle of attack, induced angle of attack change and geometric angle of attack as a function of time for a wind rotor.
Figure 15:
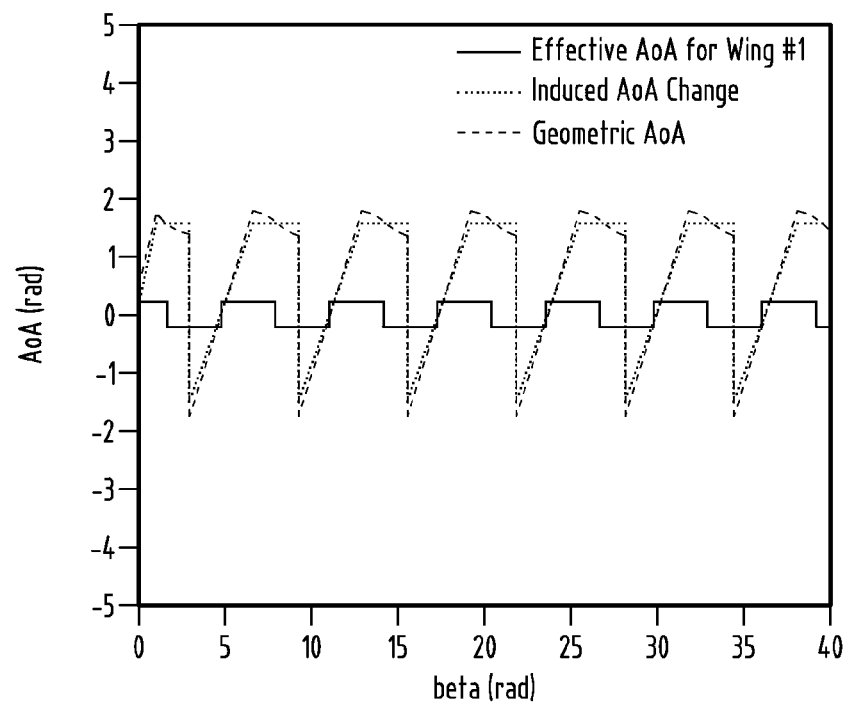
FIG. 15 is a graph of the effective angle of attack, induced angle of attack change and geometric angle of attack as a function of the rotational angle for a wind rotor.

FIG. 13 illustrates the rotational angle ($\beta$) and rate $d\beta/dt$ as a function of time in a wind rotor 10, for a wind speed of 6 m/s. The rate increases with time, and approaches an asymptotic value from the initial condition. FIG. 14 shows the effective AoA, induced AoA change and geometric AoA as a function of time for a wind rotor 10 at a wind speed of 6 m/s in a wind rotor 10 and FIG. 15 illustrates the effective AoA, induced AoA change and geometric AoA as a function of the rotational angle for a wind rotor 10 at a wind speed of 6 m/s.

Figure 16:
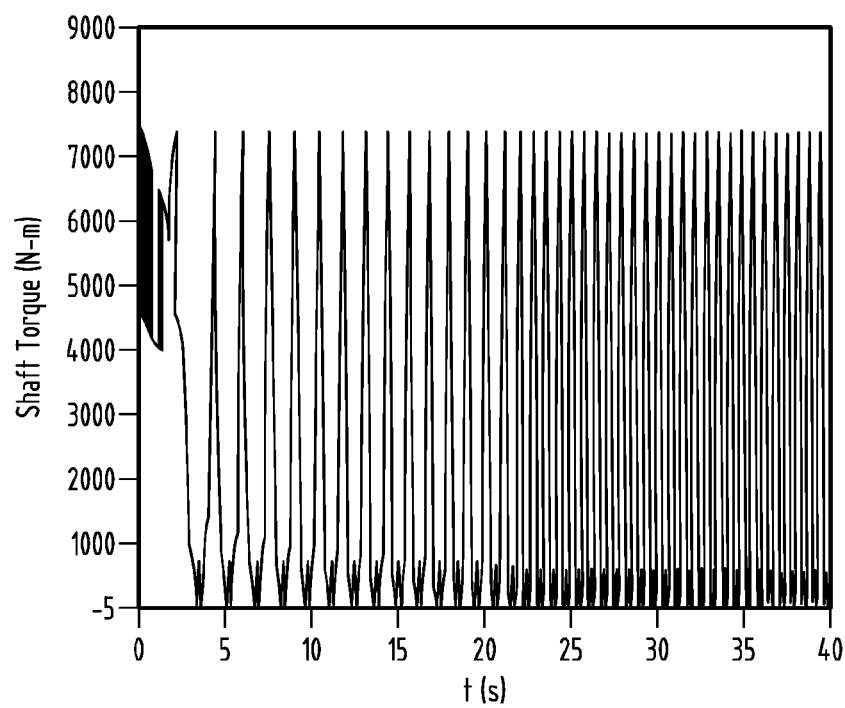
FIG. 16 is a graph of the time history of the torque in a wind rotor.
Figure 17:
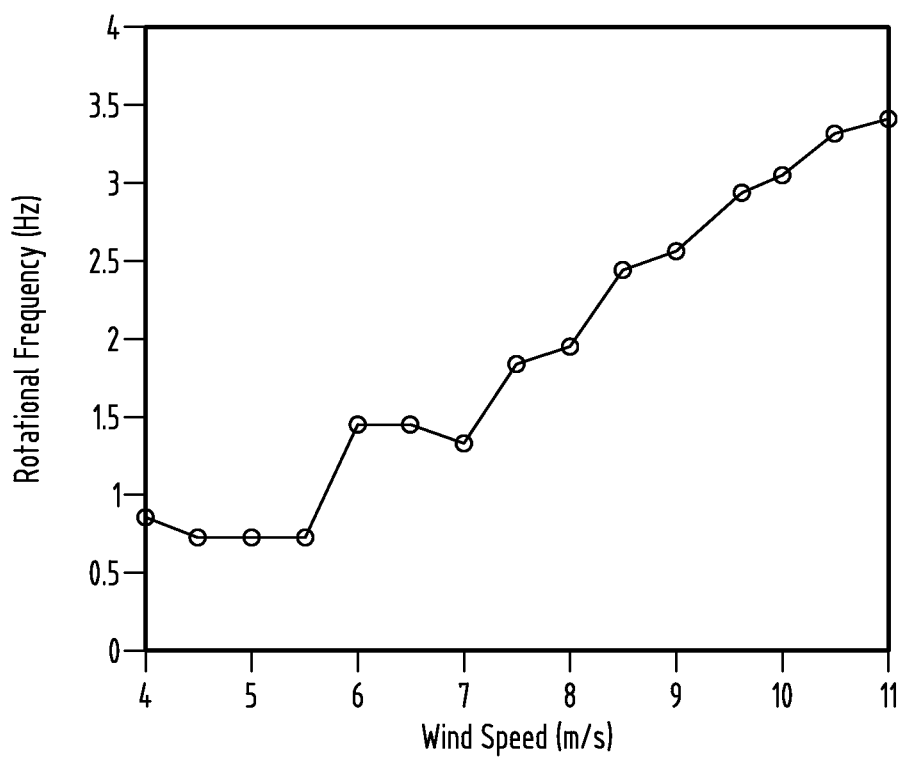
FIG. 17 is a graph of the rotational frequency as a function of the wind speed in a wind rotor.
Figure 18:
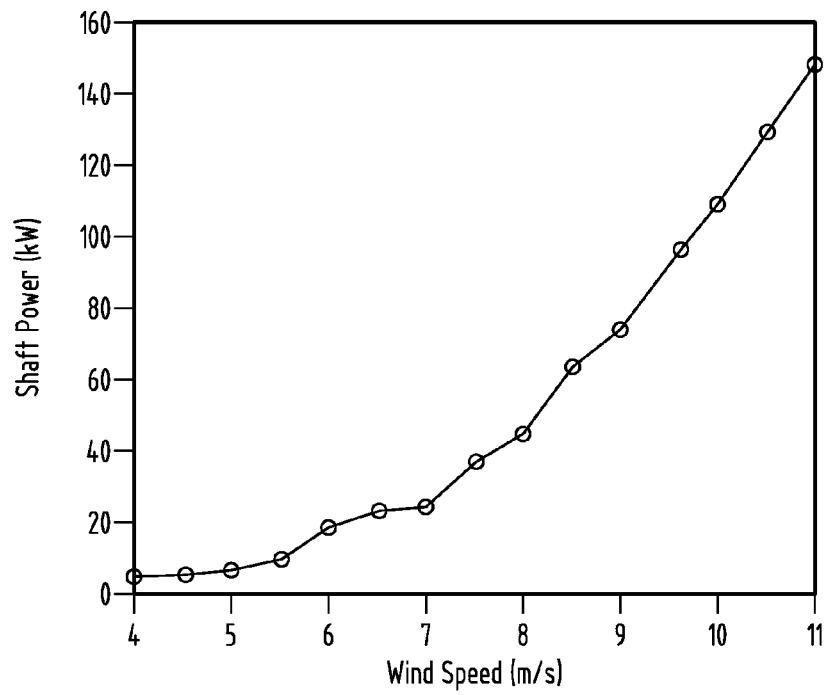
FIG. 18 is a graph of the shaft power as a function of the wind speed in a wind rotor.
Figure 19:
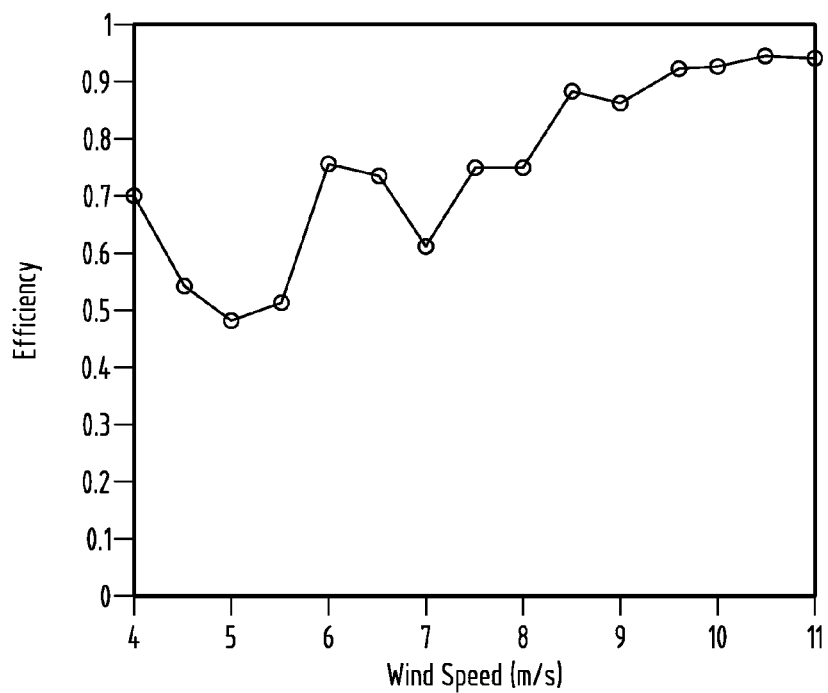
FIG. 19 is a graph of the efficiency of power generation as a function of the wind speed in a wind rotor.

FIG. 16 illustrates the torque in a wind rotor 10 as a function of time. FIGS. 17-19 illustrate the rotational frequency, power and efficiency of power generation, all as a function of the wind speed $V_\infty$ for a wind rotor 10. At the frequently encountered wind speed of 6 m/s, the rotational wind rotor 10 can produce about 20 kW of power. The efficiency of the wind rotor 10 is calculated using Equation (14). The efficiency of the wind rotor 10 is about 50% to about 70% at wind speeds of 4-8 m/s. Unlike the decaying trend of efficiency in an oscillator at a fixed oscillating frequency, the efficiency in a wind rotor slightly increases with the wind speed since the rotational frequency increases accordingly, as shown in FIG. 17.

The dynamics of a wind oscillator 10 and a wind rotor 10, 70 are described by the same equation of motion in which the aerodynamic forces on a set of first wing 20 and second wing 22 act as the driving forces for the generation of electricity. The geometric AoA of the wings are actively controlled in such a way that the effective AoAs are maintained at the designated, calculated value for maximum lift. The performances of the wind oscillator 10 or wind rotor 10, 70 are determined by solving the equation of motion provided above, and the analysis provided herein indicates that the capability of power generation of the wind oscillator 10 and wind rotor 10, 70 is at least comparable to that of a medium-scale wind turbine. The efficiency of power generation of the wind-powered generator 10, 70 described herein is also high, particularly at low wind speeds.

The wind-powered generators 10, 70 described herein also have the advantage that the wings 20, 22 are able to be manufactured with a simple structure and geometric shape, allowing a reduction in the cost of manufacture for the wings 20, 22 as compared to more traditional HAWT and VAWT arrangements. Due to the shape and structure of the rectangular first and second wings 20, 22, as opposed to long, slender blades used for HAWT and VAWT, the requirements for selection of materials are also more relaxed. The aerodynamic forces on the entire wing surfaces can be almost uniformly utilized, and the effective wing areas can be easily enlarged while the wing weight is not a critical concern in the design of the present invention. Therefore, the aerodynamic efficiency is high. The configuration of the presently disclosed wind-powered generators 10, 70 also allows for easier access to the gearbox 32 and generator 30 than in conventional designs. For the above reasons, the installation, maintenance and repair of the presently disclosed wind-powered generators 10, 70 are easier and less expensive than for traditional HAWT and VAWT.

Although certain preferred embodiments of the invention have been disclosed in detail for illustrative purposes, it will be recognized that variations or modifications of the disclosed apparatus, including the rearrangement of parts lie within the scope of the present invention.

The invention claimed is:

1. A fluid flow-powered generator, comprising:
   a rotatable frame;
   a first wing and a second wing, each wing having a leading edge, a trailing edge, a first end and a second end;
   each wing having an angle of attack determined by the orientation of a chord line extending through the leading and trailing edges thereof, and each wing pivotally mounted to the frame to allow the angle of attack to be adjusted; and
   one or more powered actuators configured to pivot the first and second wings to adjust the angles of attack; wherein the rotatable frame comprises a central axis member, a first pair of transverse arms and a second pair of transverse arms, each extending from the central axis member and wherein the first wing is mounted at its first end and second end between the first pair of transverse arms and the second wing is mounted at its first end and second end between the second pair of transverse arms;
   a first sensor configured to measure a rotational rate of the rotatable frame, and a second sensor configured to measure an incoming wind speed;
   a controller configured to utilize measured data concerning the rotational rate and the incoming wind speed to actuate the one or more powered actuators and actively adjust the angle of attack of the first wing and the second wing in a coordinated manner, causing the rotatable frame to rotate in an oscillating manner due to the adjustment of the angle of attack while the fluid flow-powered generator is in use.

2. The fluid flow-powered generator of claim 1, wherein the first and second pairs of transverse arms and central axis member are on approximately the same plane, and where the frame is rotatable around the central axis member.

3. The fluid flow-powered generator of claim 2, wherein the frame is mounted on a rotatable table which is adjustable to align the central axis member of the frame perpendicularly with the direction of a fluid flow.

4. The fluid flow-powered generator of claim 2, further comprising a spring system to restrain the rotation of the frame about the central axis member, wherein the rotation of the frame is constrained to an angular position between about $-\pi/2$ and about $\pi/2$.

5. The fluid flow-powered generator of claim 1, wherein the controller maintains the angle of attack of the first wing and the second wing at a maximum effective angle of attack before stall.

6. The fluid flow-powered generator of claim 1, wherein the first wing and second wing are mounted to transverse arms along the chord line at one quarter of the distance from the leading edge to the trailing edge, and wherein the first wing and second wing are pivotable about this mounting position.

7. An oscillating fluid flow-powered generator, comprising:
   a rotatable frame;
   a first wing and a second wing, each wing having a leading edge, a trailing edge, a first end and a second end; wherein the rotatable frame comprises a central axis member, a first pair of transverse arms and a second pair of transverse arms, each extending from the central axis member and wherein the first wing is mounted at its first end and second end between the first pair of transverse arms and the second wing is mounted at its first end and second end between the second pair of transverse arms;

each wing defining an angle of attack; and a controller configured to actively adjust the angle of attack of the first wing and the angle of attack of the second wing in a coordinated manner by actuation of at least one powered actuator while the fluid flow-powered generator is in use, such that the angle of attack of each wing alternates and causes the rotatable frame to rotate in an oscillating manner.

8. The oscillating fluid flow-powered generator of claim 7, wherein the first and second pairs of transverse arms are on approximately the same plane.

9. The oscillating fluid flow-powered generator of claim 8, wherein the central axis member is oriented in a generally vertical direction.

10. The oscillating fluid flow-powered generator of claim 8, wherein the central axis member is oriented in a generally horizontal direction.

11. The oscillating fluid flow-powered generator of claim 7, wherein the angle of attack of each wing is determined by the orientation of a chord line extending through the leading and trailing edges thereof, and each wing is pivotally mounted to the frame to allow the angle of attack to be adjusted.

12. The oscillating fluid flow-powered generator of claim 7, further comprising:

an accelerometer located to measure the rotational rate and angular position of the frame, and a sensor to measure fluid flow speed, wherein the controller directs adjustment of the angle of attack of the first wing and the second wing based upon the rotational rate and angular position of the frame, and the fluid flow speed.

13. The oscillating fluid flow-powered generator of claim 12, wherein the controller maintains the angle of attack of the first wing and the second wing at a maximum effective angle of attack before stall.

14. A method of generating electricity, comprising the steps of:

providing a fluid flow-powered generator having a rotatable frame, a first wing and a second wing attached to the frame, and a controller, wherein the first wing and second wing each have an adjustable angle of attack; wherein the rotatable frame comprises a central axis member, a first pair of transverse arms and a second pair of transverse arms, each extending from the central axis member and wherein the first wing is mounted at its first end and second end between the first pair of transverse arms and the second wing is mounted at its first end and second end between the second pair of transverse arms;

utilizing the controller and at least one powered actuator to actively adjust the angle of attack of the first wing and the angle of attack of the second wing in a coordinated manner to cause the rotatable frame to rotate in an oscillating manner;

translating rotation of the rotatable member into electrical energy.

15. The method of claim 14, further comprising the steps of:

measuring the rotational rate and angular position of the frame, and the fluid flow speed; and utilizing a controller to actively adjust the angle of attack of the first wing and the angle of attack of the second wing based, at least in part, upon the rotational rate and angular position of the frame, and the fluid flow speed.

16. The method of claim 15, wherein the rotation of the frame is constrained to an angular position between about $-\pi/2$ and about $\pi/2$, and wherein the angle of attack of the first wing and the angle of attack of the second wing are actively adjusted by the controller to facilitate the oscillation of the frame between the angular positions.

17. The fluid flow-powered generator of claim 1, wherein the one or more powered actuators comprise motors.

* * * * *